J. A. Cookerly,
Quilting Frame.
No. 103,987.    Patented June 7, 1870.
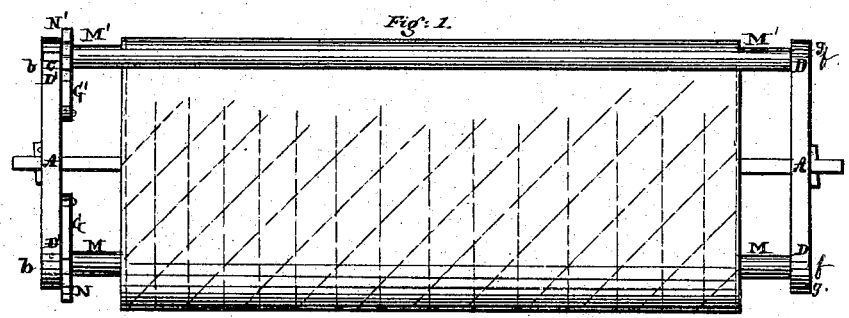
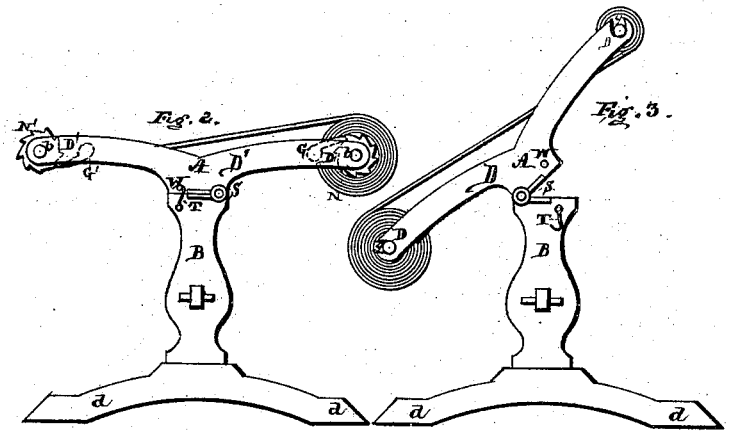

United States Patent Office.

JOHN A. COOKERLY, OF MIDDLETOWN, MARYLAND.

Letters Patent No. 103,987, dated June 7, 1870.

IMPROVED QUILTING-FRAME.

The Schedule referred to in these Letters Patent and making part of the same.

*To all whom it may concern:*

Be it known that I, JOHN A. COOKERLY, of Middletown, in the county of Frederick and State of Maryland, have invented a new and useful Improvement in Quilting-Frames; and I do hereby declare the following to be a full, clear, and exact description of the same, reference being had to the accompanying drawing forming part of this specification, in which—

Figure 1 is a top view.
Figure 2 is an end view.
Figure 3 is an end view opposite to that of fig. 2.

Nature and Object of the Invention.

This invention consists in the combination and arrangement of the rollers of a quilting-frame, having their journals resting in end pieces or bearings hinged to supporting-frames, and providing said rollers with a ratchet and pawl mechanism, in such a manner that the rollers rotate in an opposite direction to each other on being turned, when the material is attached to them, thus retaining at all times the journals in their proper position in the open slotted bearing, by means of the tension of said material upon the rollers, and permitting the ready rolling or winding of the quilt without the employment of cranks or other handles; and, to this end, My invention consists of the following devices hereinafter to be described.

Description.

A A, in the drawings, represent the ends of the supporting-frame or table B B, which, extending downward, branches off, forming, as it were, feet $d\ d$.

D D' represent the end pieces or bearing-bars, one of which, D', is provided with pawls G G' and a circular bearing, $b\ b$, for the end of the journal $c\ c$ of the rollers M M', the other (D) having open slotted bearings $g\ g$ for the other ends of the journals $f\ f$ upon said rollers M M'.

Upon one end of the rollers M M', next to the journal $c\ c$, which rest in the bearings $b\ b$ of the end piece or bearing D, are located the ratchet-wheels N N', which are operated upon and controlled by the pawls G G', by which, from their location and arrangement, the rollers are caused to rotate in an opposite direction, winding up the material placed or secured upon them, by which means a tension is produced and the rollers retained in the open slotted bearings $g\ g$.

The pawl G' may be held up against the ratchet by means of a suitably-located spring, or by tightening its axis, but the tension of the quilt will afterward keep said pawl to its place.

It will be seen that the quilt, in the course of completion, is wound up under and on one roller, the hands being made to move over said roller, and thus operate it in a convenient manner, the employment of handles for such purpose being unnecessary in this arrangement.

The end pieces or bearings D D' are attached or otherwise pivoted to the supporting-frame or table A by means of a hinge, S, and, when in use, are held in a horizontal position, by means of hooks T secured upon the supporting-frame or table A, and an eye, W, upon the end pieces or bearings D D'.

When the quilting-frame is not being used the hook is detached from the eye, and the end pieces or bearings carrying the rollers are folded down, becoming perpendicular instead of horizontal, thus occupying but a small space—a great advantage over those now in use.

It will thus be seen that I have produced a quilting-frame which is convenient, simple in construction, cheap, and durable, easily taken apart and put together when desired.

Having thus described my invention,

What I claim as new, and desire to secure by Letters Patent, is—

The reverse rollers M M', ratchet-wheel N N', pawls G G', bearings D D', and open slots $g\ g'$, constructed and arranged as described, so that the rollers are retained in position by the aid of the tension of the quilt, and the latter rolled from one roller under and on the other, in the manner and for the purpose set forth and shown.

To the above I have signed my name this 16th day of March, 1870.

JOHN A. COOKERLY.

Witnesses:
GEORGE W. CHAMBERLIN,
CHAS. E. COOKERLY.